Aug. 26, 1958
T. H. STIEBEL
2,849,590
MINIATURE IMMERSION HEATER WITH
BUILT-IN, MANUALLY
OPERABLE, SWITCH
Filed July 3, 1957
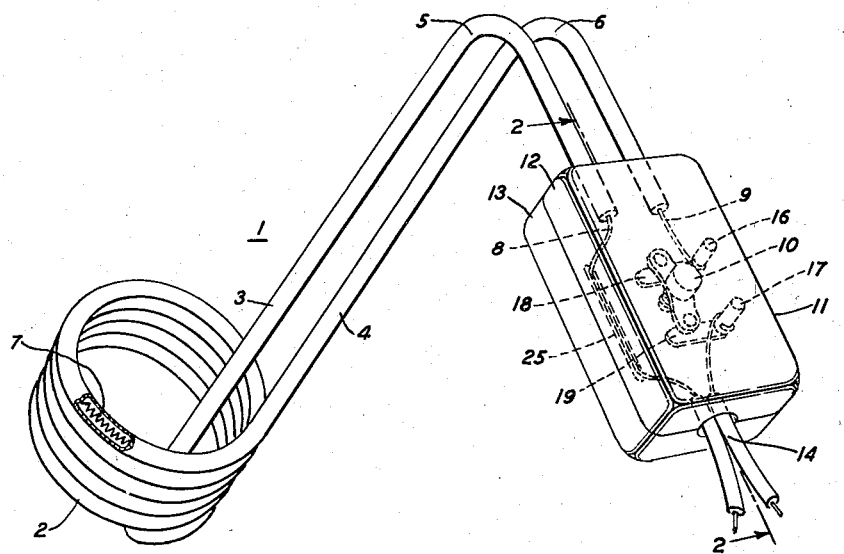
FIG. 1
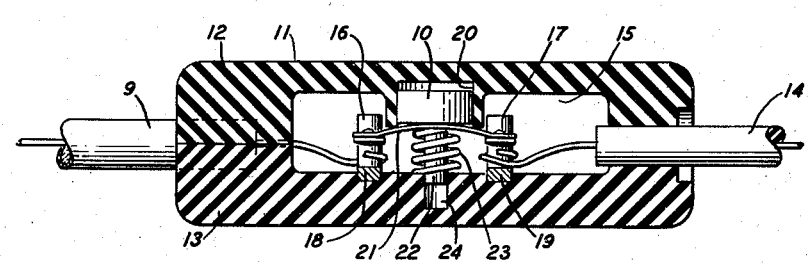
FIG. 2
INVENTOR
THEODOR H. STIEBEL
BY
ATTORNEY

United States Patent Office 2,849,590
Patented Aug. 26, 1958

2,849,590

MINIATURE IMMERSION HEATER WITH BUILT-IN, MANUALLY OPERABLE, SWITCH

Theodor H. Stiebel, Holzminden (Weser), Germany

Application July 3, 1957, Serial No. 669,757

4 Claims. (Cl. 219—41)

The instant invention relates to electrical immersion heaters, preferably of miniature size, with a built-in switch in its handle which is manually operable to energize the coil and is spring restored to its open position.

An object of the invention is to provide a relatively inexpensive and simple electrical immersion heater of miniature size mechanically but of adequate electrical power for household or travel purposes for heating relatively small quantities of liquid, for example, water, quickly to boiling.

A further object of the instant invention is to provide an electric switch in the handle of the immersion heater which is completely enclosed in a waterproof casing flexible in at least the region of the casing above the switch button by which switch the energizing current is caused to flow through the heating coil only so long as the region of the casing above the button and hence the button thereof, are depressed by, for example, the thumb of the user.

A further object of the invention is to provide a simple yet positive acting switch means incorporated in the heater which, even though the heater cord is connected to a source of electric current, prevents the energization of the heater coil during periods of abstraction or forgetfulness of the user of the heater, and does so without the use of expensive and complicated controllers or the like.

Still a further object of the invention is so to incorporate a positive self-opening switch in the handle of a miniature immersion heater that the switch button is positioned within the flexible portion of the handle casing at the region thereof where the thumb of the person holding the handle would normally be when inserting the heater into the liquid containing vessel.

The foregoing objects and features, as well as others, will more clearly appear from the following description of an illustrative embodiment thereof in conjunction with the appended drawing, in which:

Figure 1 is a perspective view of the pocket type immersion heater particularly adapted for travel use, with portions thereof cut away to show the position of some of the internal elements; and Figure 2 is a section along line 2—2 of Figure 1.

The illustrative embodiment of the miniature immersion heater shown in the drawing comprises a heating tube 1 having a coiled portion 2 at its lower end and two straight tube portions, 3 and 4, spaced from each other, which merge into the parallel curved or hooked portions 5 and 6, adapted to be hung over the rim of the vessel containing the liquid to be heated. Within the coiled portion a heating wire 7 is packed in a heat conducting electrical insulating material, for example magnesium oxide, by which the heat generated on energization of the heating wire 7 is transmitted to the liquid through the portions of the tube 1 in the liquid. By way of example, one practical embodiment of the type disclosed had a total height from the lower turn of coil 2 to the uppermost points of curved tube portions, 5 and 6, of some five inches while the outer diameter of the coil is some one and one-fourth inches, with a heating rating of 500 watts. The heating wire 7 is connected by a pair of conductors, 8 and 9, within the respective straight tube portions, 3 and 4, to a line supply, not shown, by way of a switch having a button 10 of which the elements are within the handle 11 of non-heat conducting material, preferably of a molded plastic. The free end regions of the hooked tube portions, 5 and 6, are clamped and cemented watertight between the upper and lower members, 12 and 13, of the handle 11, while the end regions of cord 14, connecting to the line supply through the usual plug and socket, are similarly clamped between such upper and lower handle members at the other end of the relatively elongated handle 11. The central portion of the upper handle member 12, as a minimum is of a resilient material which may readily be depressed by slight pressure and is self-restoring on release of such pressure. The abutting surfaces of upper and lower members, 12 and 13, are cemented to each other by an appropriate bonding material forming a watertight handle with a formed hollow interior 15.

Within the hollow interior 15 of the handle 11, a pair of terminals, 16 and 17, of electrically conductive material extend upwardly and have integral electrically conductive projections, 18 and 19, extending parallel to each other in the same direction from the respective terminals and having their lower surfaces embedded, for example, in the lower handle member 13. To one terminal, 16, is connected one connecting wire 9 from the heating coil, while one of the conductors of the cord or cable 14 is connected to terminal 17, the other connecting wire 8 of the heating coil being directly connected within the handle to the other conductor of the line supply cable 14 in a channel 25 extending longitudinally within the handle and isolated from the terminals and their integral projections. It will be noted that the base projections, 18 and 19, are on the bottom of the hollow interior 15, that is, extend slightly upwardly from the base of the recess in the bottom handle member 13 and transversely the handle to both sides of the longitudinal center line of handle 11, and that the terminals, 16 and 17, are spaced from, and to the same side of, such center line. The button 10, of a synthetic electrically and thermally non-conductive, material, or vulcanized rubber, for example, extends into a bore 20 on such center line in but not through the upper handle member 12 and within the hollow interior 15 carries a downwardly bowed plate spring 21 centered thereon by a post 22 integral with button 10 and extending through an aperture in the plate spring. A helical spring 23 braced between the bottom of the hollow interior 15 and the lower surface of plate spring 21, and into which the button post 22 extends in coaxial alignment, is of such magnitude as continuously to push the bowed plate spring 21 upwardly to strike the top of the hollow interior so that both ends of the plate spring 21 are out of contact with terminal projections, 18 and 19. A bore 24 extending into, but not through the lower handle member 13, registers with the post 22 and is of a diameter that post 22 can readily enter it. Preferably the end regions of the spring 21 are provided at least on their lower face with a special contact material which is non-oxidizing and wear resistant, as are also the upper faces of the projections, 18 and 19. Upon assembly of the respective switch parts with the lower and upper housing members, the latter are integrally connected to each other so as to be watertight by any known means including bonding to each other.

Thus, to energize the heater, the central region of the upper casing member 12 is pushed by the thumb of the hand holding the immersion heater with its hooked tube portions on the rim of the liquid containing vessel and the tube coiled portion immersed in the liquid, inwardly into the interior region thus pushing button 10 against the opposing pressure of spring 23 so that the ends of the bowed plate spring 21 engage projections, 18 and 19, thus completing the electric circuit. The bowed spring 21 is of such length, and the bore 24 of such depth, that the ends of spring 21 may, after having made the initial contact therewith, slide on the upper surfaces of the projections, 18 and 19, to make even more intimate contact therewith, the bore 24 limiting such sliding by having pin 22 strike its bottom when the spring 21 has become not quite flat. It follows that with the helical spring 23 now compressed its maximum and the bowed plate spring 21 deformed to substantially its maximum, the upward spring force of both of them combined tends positively to restore the button to its pre-operated position, and does so restore the button and break the circuit just as soon as the external pressure on upper member 12 of the handle is removed, with the helical spring 23 ultimately pushing the button 10 and plate spring 21 sufficiently to disengage its ends from the terminal projections and keep spring 21 pressed against the top of the hollow interior 15.

What I claim is:

1. In an electric immersion heater including a heating coil, a metal tube enclosing the coil and having a pair of parallel free end portions, a switch comprising a handle about the free end portions of the tube, the handle having one wall of which at least a portion is flexible, a cavity within the handle, a pair of spaced fixed terminals within the cavity, a cable extending into the handle for connection at its free end to a line supply of which one conductor is connected to one of the pair of terminals, a first conductor connecting one end of the coil within one of the straight tube portions to the other of the terminals in the cavity, a second conductor connecting the other end of the coil within the other straight tube portion and within the handle to the other conductor of the cable, a conductive bridge movable to engage and disengage the pair of spaced terminals, a spring biasing the bridge to disengagement from the terminals, and a button on the bridge and extending into but not through the flexible portion of the one wall of the handle so that on depression of such portion the button is movable against the biasing spring to engage the bridge with the spaced terminals.

2. A switch for an immersion heater according to claim 1 in which each terminal has a base projection, the projections being parallel, codirectional and coplanar, and the bridge is a plate spring bowed with its ends closer to the plane of the projections than is the center of the plate spring.

3. A switch for an immersion heater according to claim 1 in which each terminal includes an upright post and a base projection integral therewith, the base projections being codirectional, parallel and coplanar, and perpendicular to the bridge, the bridge is a plate spring bowed concavely relative to the base projections, and the length of the plate spring is less than the parallel dimension of the cavity to permit sliding and wiping of the plate spring ends across the base projections.

4. A switch for an immersion heater according to claim 1 in which each terminal has an integral conductive projection at its base, the base projections being codirectional, coplanar and parallel to each other and perpendicular to the bridge, the bridge is a preformed plate spring bowed with its center at a greater distance from the plane of the projections than its ends, an aperture through the central region of the plate spring, a coaxial extension integral with the button and extending through the plate spring aperture, the biasing spring is a helical coil coaxial with the button extension of which a portion extends thereinto, and a bore of predetermined depth in the bottom of the cavity adapted to receive the integral extension on pressing the plate spring against the biasing force of the helical spring, the bottom of the bore acting as a stop to limit the compression of the helical spring and the flattening of the plate spring, the top of the cavity acting as the stop against which the helical spring normally maintains the bowed plate spring.

References Cited in the file of this patent

UNITED STATES PATENTS

| 857,485 | Reardon | June 18, 1907 |
| 1,508,199 | Thornton | Sept. 9, 1924 |
| 1,570,507 | Lightfoot | Jan. 19, 1926 |
| 2,254,330 | Stiebel | Sept. 2, 1941 |
| 2,752,463 | Staak | June 26, 1956 |